METHOD AND APPARATUS FOR MONITORING THE OPERATION OF UNATTENDED AMPLIFIERS

Filed July 28, 1966 Sheet 1 of 2

INVENTOR
R. R. BARNES
BY Leonard M. Arnold
ATTORNEY

United States Patent Office 3,450,847

Patented June 17, 1969

3,450,847
METHOD AND APPARATUS FOR MONITORING THE OPERATION OF UNATTENDED AMPLIFIERS

Richard R. Barnes, Dallas, Tex., assignor to Bell Telephone Laboratories, Incorporated, Murray Hill, N.J., a corporation of New York Filed July 28, 1966, Ser. No. 568,498
Int. Cl. H04b 3/46
U.S. Cl. 179—175.31 5 Claims

ABSTRACT OF THE DISCLOSURE

A repeater monitoring system capable of locating a faulty or inoperative repeater and measuring its operating characteristics. Each repeater is provided with an oscillator for generating a test tone having a frequency peculiar to and indicative of that repeater, and to be turned on in groups or test sections along the transmission line. The frequency is reduced by means of a beat frequency and the reduced frequency signal is passed through appropriate filters that respond to a special sequencing arrangement. A nulling system is provided for comparison of the received signals.

This invention relates to communication systems using unattended repeating amplifiers and more particularly, although not exclusively, to apparatus for locating a faulty or inoperative one of a plurality of tandem repeating amplifiers which are geographically distributed over a transmission path.

An object of the invention is to facilitate supervision of a repeatered communication system.

Since these repeaters are quite often located at points which are accessible only with difficulty, it is a further object of the invention to locate a marginal or inoperative amplifier from a terminal of the transmission path.

In a principal aspect, the present invention takes the form of a repeater monitoring system capable of locating a faulty or inoperative repeater and measuring its operating characteristics. Each repeater is provided with an oscillator for generating a test tone having a frequency peculiar to and indicative of that repeater, and the oscillators are arranged to be turned on in groups or test sections along the transmission line. The oscillator signals from the repeater at the end of each group or test section remote from a receiving terminal, are compared at that receiving terminal with a locally generated reference signal to determine which group contains a faulty repeater. The repeaters within the group, or test section, are then tested in subgroups of three consecutive repeaters obtained in each instance by dropping the first repeater of a tested subgroup and adding the next successive repeater to form a new subgroup. The test of a particular subgroup is performed by first reducing the frequencies of the signals received from the repeaters by means of a beat frequency oscillator, rectifying the resulting signals, halving the amplitude and reversing the polartiy of the rectified signals derived from the first and third consecutive repeaters under test, and then measuring the sum of the halved signals and the rectified signal derived from the second repeater under test. If the sum is not equal to zero the repeater present in this subgroup of three repeaters which was not present in the last tested subgroup is the faulty repeater. Measuring apparatus embodying this invention inherently corrects for any difference in repeater output level due to failure to exactly overcome cable losses.

This invention will be more fully comprehended from the following detailed description in which.

In most modern broadband carrier transmission systems, the necessary automatic gain equalization is performed in three steps, each involving a particular kind of repeater. The first step of such equalization is performed by a so-called auxiliary repeater whose nominal gain characteristic is designed to match and compensate for the loss characteristic of the transmission cable. The second step of such gain equalization compensates for the aging of active devices in the repeater amplifiers, and also compensates for temperature variations. This second function is performed by so-called regulating repeaters. Finally, so-called equalizing repeaters compensate for second order effects of cable loss, device aging and temperature variation.

Figure 1:
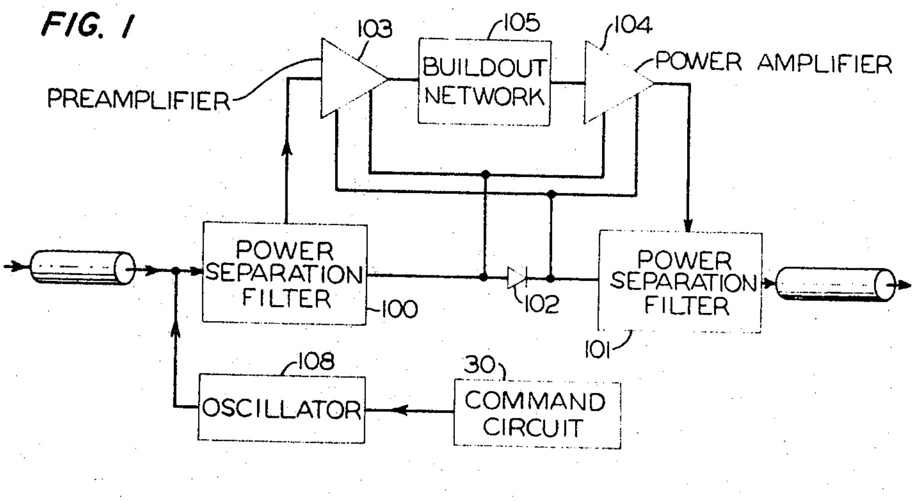
FIG. 1 is a block diagram of a typical repeater.

The basic repeater employed is shown in FIG. 1. Power separation filters 100 and 101 connect the input and output, respectively, of the repeater to the transmission line, and separate the direct current from the A-C signal. Connected between the power separation filters is a regulating diode 102 across whose terminals are connected the D-C power terminals of a preamplifier 103 and power amplifier 104, which are interconnected by a line build-out network 195. The A-C signal from the line is applied by the power separation filter 100 to the input of the preamplifier 103 and the signal output from the power amplifier 104 is reapplied to the line through power separation filter 101. An oscillator 108 has its output terminal connected to the input terminal of power separation filter 100. Normally this oscillator is not operating because its D-C power is turned off. The D-C power to oscillator 108 is supplied from a command circuit 30 at the receiving terminal so that the oscillator may be turned on under the control of an operator to apply its output signal to the input of the repeater so that the repeater may be tested.

Figure 2:
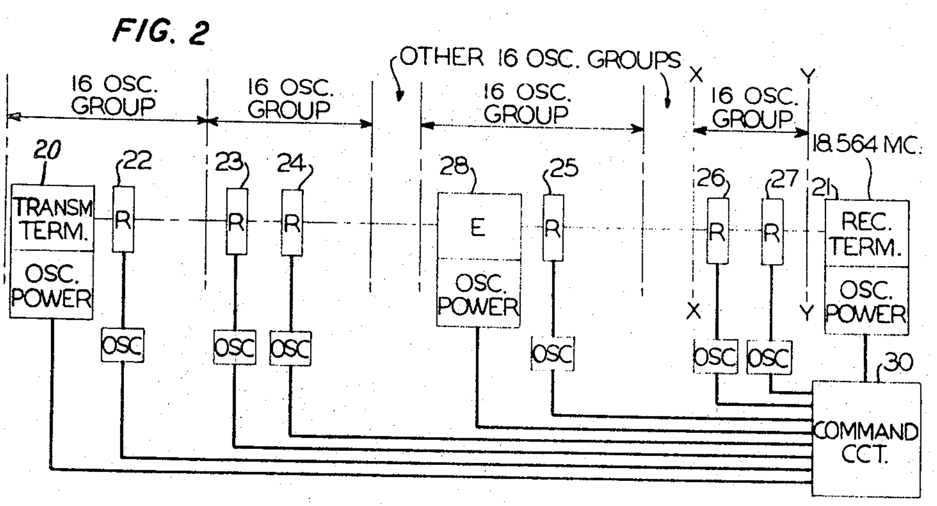
FIG. 2 is a block diagram of the transmission line containing repeaters to be tested.
Figure 3:
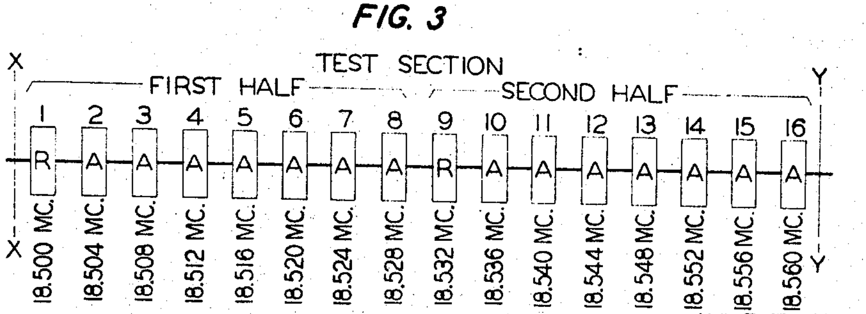
FIG. 3 is a block diagram of one portion of the transmission line under test which portion contains one group of repeaters comprising a test section.

The arrangement of these three types of repeaters in a broadband carrier transmission system is illustrated in FIGS. 2 and 3. Between a transmitting terminal 20 and a receiving terminal 21 there are a number of regulating repeaters 22, 23, 24 . . . 25 . . . 26, and 27 and an equalizing repeater 28 is located midway between terminals 20 and 21. The auxiliary repeaters are not shown in FIG. 2 but are shown in FIG. 3 which, as indicated, is an enlarged version of the transmission line between the left-hand terminal of regulating repeater 26 and receiving terminal 21. Typically, such a portion of the transmission line may encompass 16 repeaters, 14 of which are of the auxiliary type and two of which are of the regulating type. In the arrangement of these repeaters shown in FIG. 3, the group of 16 repeaters is divided into so-called first and second halves with the two halves together comprising a so-called test section. The repeaters in the first half of a test section, or half closer to the transmitting terminal are numbered 1 through 8, and the repeaters in the second half, or half closer to the receiving terminal are numbered 9 through 16. All the test sections are identical except for the one closest to the transmitting terminal 20 and the one in the center of the transmission line containing the equalizing repeater. In the former case an oscillator associated with the transmitting terminal is substituted for the oscillator of the first repeater of the illustrated test section in making tests, while in the latter case an oscillator associated with the equalizing repeater is substituted for the oscillator of the first repeater.

Figure 4:
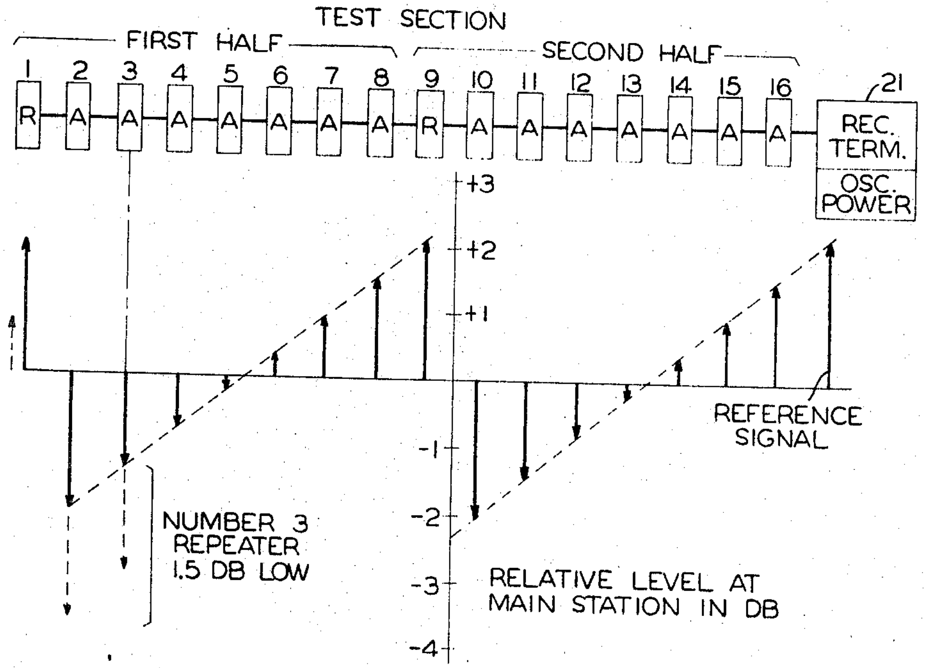
FIG. 4 illustrates the relative amplitudes of the repeater oscillator signals from one test section as received at a receiving terminal.

As described above, each repeater in the transmission system is equipped with an oscillator which may be turned on from the receiving terminal under the control of the command control circuit 30. In accordance with this invention only the oscillators connected to a number of repeaters comprising a test section are turned on at a given time. When turned on the signals received at the receiving terminal 21 from all 16 oscillators in the test section should ideally be at the same transmission level with each auxiliary repeater exactly compensating for signal losses. Under actual operating conditions, however, the auxiliary repeaters usually fail to exactly compensate exactly for cable losses. FIG. 4 illustrates one possible example of the relative levels of the oscillator signals as received at the receiving terminal 21 shown in FIG. 2. The upper portion of the figure shows the test section whose oscillators have been turned on and the arrows in the lower portion indicate the relative levels at the receiving station in decibels of the signals from the respective oscillators whose repeaters are shown immediately above the arrow. The solid arrows illustrate a typical example of transmission signal levels when all the repeaters are operating satisfactorily but the cable loss between repeaters exceeds the gain of each auxiliary repeater by a small amount. This failure to exactly compensate for cable losses results, as shown in the illustrative example in FIG. 3, in a slope of 4 db in the level of the oscillator signals from each half of the test section. The regulating repeater which is located in the middle of the test section compensates for this failure to exactly compensate exactly for cable losses and as a result the slope occurs twice in the full test section. In the unlikely event the auxiliary repeaters exactly compensate for cable losses, then, as stated above, the signals received from the oscillators would all be at the same level and there would be no slope in the level of the oscillator signal from each half of the test section.

When a troube condition occurs, there is a reduction in the level of the test signals. This is illustrated in FIG. 4 wherein the third repeater in the test section has lost gain and as a result the signal level from it and all preceding repeaters is reduced. The effect of this loss in gain in the third repeater is indicated by the dashed lines beneath the third, second, and first auxiliary repeaters which indicate that signals received therefrom are reduced.

Thus, the received oscillator signals under ideal conditions, wherein the auxiliary repeaters exactly compensate for the cable losses, are of the same amplitude. In the more likely situation, the received signals will have different amplitudes with resulting slopes in either direction due to temperature variations in the cable. Finally, in the event of repeater failure, the signals received can be sharply attenuated. In accordance with this invention, an abrupt difference in the level of the test signals caused by a repeater failure is detected regardless of the amount and direction of the slope in the transmission levels due to the failure of auxiliary repeaters, though operating satisfactorily, to exactly compensate for cable losses.

To facilitate the most rapid determination of the location of a faulty repeater the oscillator signals from the first regulating repeater in each test section are first examined in order starting with the test section closest to the receiving terminal to isolate any test section which may contain a faulty repeater. Once a particular test section is known to contain a faulty repeater the repeaters within that test section are then tested by comparing their test signals three at a time until the faulty repeater is located.

More specifically, in accordance with this invention the repeaters are tested by first comparing the received signal level from the first regulating repeater in each test section with a reference signal generated by an oscillator at the receiving terminal 21. This is done most quickly by first turning on the power to the oscillators of each test section starting with the section nearest the receiving terminal 21 and working back sequentially from terminal 21. The test section experiencing trouble is indicated by a difference in transmission level between the oscillator signal received from its first regulating repeater and the reference signal. The repeaters within the group are then tested in subgroups of three consecutive repeaters by first reducing the frequencies of the signals received from the repeaters by means of a beat frequency oscillator, halving the amplitude and reversing the polarity of the signals derived from the first and third repeaters, and then measuring the sum of the halved signals and the signal derived from the second repeater under test. If the sum is not equal to zero the repeater present in this subgroup of three repeaters not present in the last tested subgroup is the faulty repeater. This measuring technique corrects for any differences in repeater output level due to the failure of the auxiliary repeaters to exactly overcome cable losses resulting in a sloping of the transmission levels as shown in FIG. 4. In addition it permits detection of a faulty repeater where all other repeaters are exactly compensating for cable losses.

In accordance with this invention the first repeater in each test section such as that shown in FIG. 3 is assigned a predetermined frequency and each higher numbered repeater is assigned a frequency which is a predetermined frequency higher. Thus, for example, if the number 1 repeater is assigned a frequency of 18.500 mc. then the number 2 repeater in the test section could be assigned a frequency of 18.504 mc., the number 3 repeater 18.508 mc. and so forth. An illustrative example of such assigned frequencies is shown in FIG. 3 wherein the frequency assigned each repeater is shown directly beneath that repeater.

Figure 5:
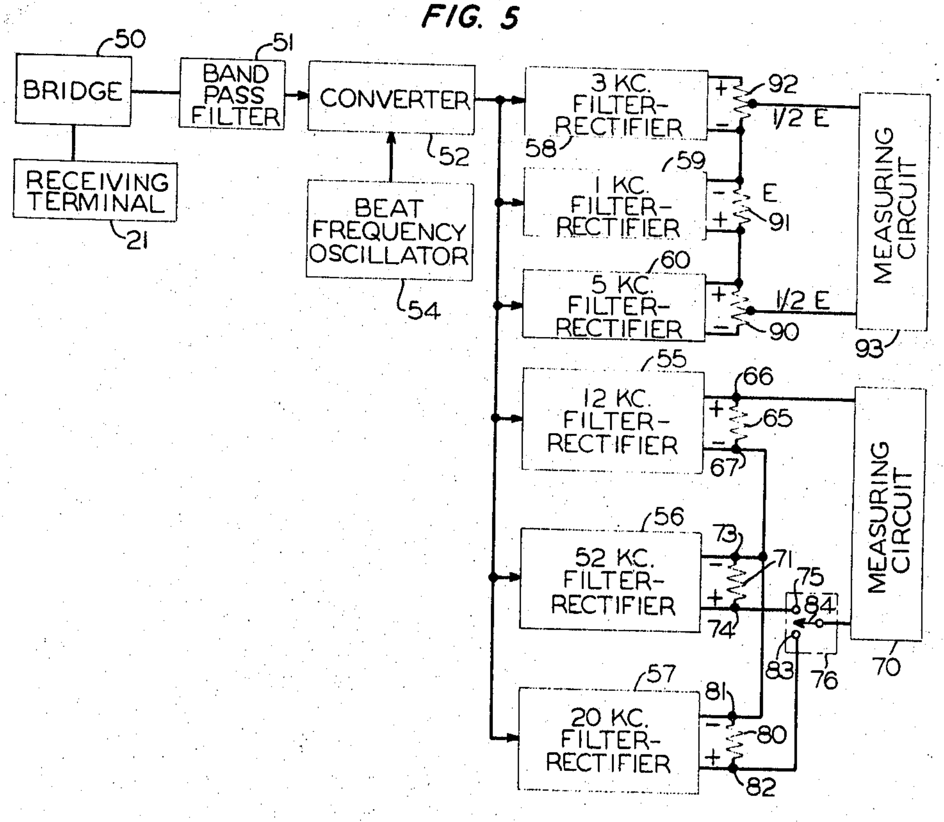
FIG. 5 is a repeater test set embodying this invention.

A block diagram of a test set embodying this invention is shown in FIG. 5. A bridge circuit 50 connects the apparatus to the receiving terminal 21 and a bandpass filter 51, whose pass band includes all the oscillator frequencies, is connected to the output of the bridge so that the filter output signal contains all the signals received from the oscillators under test as well as the reference signal generated by the oscillator at the receiving terminal 21. A converter circuit 52 together with a beat frequency oscillator 54, whose frequency may be varied, operate to convert the high frequency oscillator signals from the oscillators of the repeaters under test and the reference oscillator at the receiving terminal to lower frequency signals which are then passed through one of six filter-rectifier circuits, 55 through 60 whose output signals are compared in differential measuring circuits.

First the oscillator signals transmitted by each regulating repeater in each test section are compared with the reference signal received from the oscillator at the receiving terminal in order to isolate any test sections which may have a faulty repeater. For the illustrative frequencies shown in FIGS. 2 and 3 the 18.564 mc. signal received from the reference signal oscillator at the receiving terminal 21 is converted to a 12 kilocycle signal, by the action of the beat frequency oscillator 54 operating at 18.552 mc. and converter circuit 52, and passed through a filter-rectifier circuit 55, across whose output terminals is connected a resistor 65. The filter-rectifier circuit 55 is so arranged that the direct current voltage at the upper terminal 66 of resistor 65 is positive with respect to the lower terminal 67 and upper terminal 66 is connected to one input terminal of a measuring circuit 70, which may be a direct current voltmeter. The 18.500 mc. signal received from the oscillator of the first regulating repeater in the first half of a test section is converted to 52 kilocycles, and filtered and rectified by filter-rectifier circuit 56 whose output terminals are connected across a resistor 71. The filter-rectifier circuit 56 is so arranged that the direct current voltage at its upper terminal 73 is negative with respect to the lower terminal 74 and the lower terminal 74 is connected to one pole 75 of a switch 76. Similarly, the 18.532 mc. signal received from the regulating repeater in the second half of a test section is converted to 20 kilocycles, filtered and rectified by filter-rectifier 57, whose output is connected across a resistor 80. The filter-rectifier circuit 57 is so arranged that the upper terminal 81 is negative with respect to lower terminal 82. The lower terminal 82 is connected to pole 83 of switch 76 and terminals 67, 73, and 81 are connected together. The movable contact 84 of switch 76 may be switched between poles 75 and 83.

When movable contact 84 is connected to pole 75, the rectified reference signal level signal is, because of the polarities of the outputs of circuits 55 and 56, subtracted from the rectified signal received from the first regulating repeater. In the absence of any fault in any repeater between the regulating repeater under test and the receiving terminal 21, these two signals should exactly equal one another. The result of the subtraction should then be zero and the measuring circuit 70 will detect no difference voltage. By sequentially turning on the oscillators in each test section starting with the section closest to the receiving terminal 21, testing the first regulating repeater of each section and working backward toward the transmitting terminal, it is possible to isolate the test section wherein a faulty repeater is located. When a faulty repeater is present in the transmission line, the rectified signal received from the first regulating repeater in its test section as well as all of the regulating repeaters from succeeding test sections closer to the transmitting terminal 10 will be reduced in amplitude. For example, where there is trouble in the third repeater of a test section, as illustrated by the signal levels shown in FIG. 2, such trouble is detected by receiving a low level test signal from the first regulating repeater (No. 1). Once a faulty repeater has been located as being in a particular test section the output of the second regulating repeater (No. 9) of that test section is compared with the rectified reference signal from the oscillator at the receiving terminal in order to determine whether the faulty repeater is located in the first or second halves of that test section. In the illustrative example the beat frequency oscillator is maintained at 18.552 mc. and switch contact 84 is switched to pole 83 so that the rectified reference signal level derived by filter-rectifier circuit 55 and the signal level of the repeater oscillator derived by 20 kc. filter-rectifier circuit 57 are subtracted from each other. If the difference in these signals is zero, the faulty repeater is identified as being located in the first half of the test section. For the example shown in FIG. 4, the signal from repeater No. 9 is equal to the reference signal so that the trouble must be in that half of the test section lying between repeaters No. 1 and No. 9.

The particular faulty repeater is then located by comparing the rectified oscillator signal levels three at a time. Where the trouble is in the first half of a test section repeaters 9, 8, and 7 are tested first. Their signals are first converted to 5, 1, and 3 kilocycles, respectively, by means of beat frequency oscillator 54 and converter 52. In the example of oscillator frequencies shown in FIG. 3 this would be accomplished by operating the beat frequency oscillator at 18.527 mc. The 5, 1, and 3 kilocycle signals are derived from the output of converter 52 and rectified by filter-rectifier circuits 60, 59, and 58, respectively, whose output terminals are connected to resistors 90, 91, and 92, respectively. The resistors 90, 91, and 92 are connected in a series circuit across the terminals of a measuring circuit 93, which may be a direct current voltmeter. The input terminals of the measuring circuit 93 are connected to the midpoints of resistors 90 and 92 and the polarity of the outputs of filter-rectifier circuits 58 and 60 are inverted as compared with the polarity of the output of filter-rectifier circuit 59. As a result, the rectified 3 and 5 kilocycle signals are effectively halved in amplitude, reversed in polarity with respect to the rectified 1 kilocycle signal, and added to the rectified 1 kilocycle signal. If the trouble is not in any one of these three repeaters, then the result of such addition is zero, indicating that the trouble is not in these repeaters. By halving and inverting the polarity of the rectified 3 and 5 kilocycle signals a correction is automatically made for any amount of direction and linear slope in the three signals since regardless of the direction of such slope, or indeed whether there is any slope at all, and the result should be zero in the absence of repeater failure.

In the example of trouble illustrated in FIG. 4 the rectified output signals of the oscillators of repeaters 9, 8, and 7 would cancel each other and there would be no voltage at the measuring circuit, thus indicating that there is no trouble in any of those repeaters. Repeaters 8, 7, and 6 would next be checked followed by repeaters 7–6–5, 6–5–4, etc. When repeaters 5–4–3 are checked, an output reading will be present due to the low output of the No. 3 repeater. This indicates that the trouble lies in the third repeater. The only change required to accomplish such checking is a change in the output frequency of the beat frequency oscillator so that the repeaters $n$, $n-1$, $n-2$ under test have their oscillator signal frequencies converted to 5, 1, and 3 kilocycles, respectively. This is accomplished for the illustrative frequencies shown in FIG. 3 by changing the beat frequency oscillator signal frequency to 18.523 mc. when testing repeaters 8, 7, 6, to 18.519 mc. when testing oscillators 7, 6, 5, to 18.515 mc. when testing oscillators 6, 5, 4, etc.

Thus, in accordance with this invention the location of a faulty repeater may be rapidly determined by first comparing the rectified oscillator signal received from the regulating repeater, which is the closest repeater to the transmitting terminal of a group of repeaters in a test section, with a rectified reference signal generated by an oscillator at the receiving terminal. By starting with the first such regulating repeater in the test section closest to the receiving terminal and then testing each such regulating repeater in test sections closer to the transmitting terminal the test section having a faulty repeater may be rapidly determined. The portion of the test section having the faulty repeater may then be rapidly determined by testing the oscillator signal output of the second regulating repeater which is located in the center of the test section. If the rectified signal from the second regulating repeater is equal to the rectified reference signal then the faulty repeater lies in the first half of the test section which is that between the first and the second regulating repeaters. If the rectified signal from the second regulating repeater is not equal to the rectified reference signal then the faulty repeater lies in that half of the test section between the receiving terminal and the second regulating repeater. The repeaters within the half of the test section in which the faulty repeater is located are then tested in groups of three consecutive repeaters by halving the amplitude and reversing the polarity of the rectified signals derived from the first and third of such group of three repeaters, and then measuring the sum of the halved signals and the rectified signal derived from the second repeater.

It is to be understood that the above described arrangements are merely illustrative of the applications of the principles of the invention. Numerous other arrangements may be devised by those skilled in the art without departing from the spirit and scope of the invention.

What is claimed is:

1. Apparatus for monitoring the operation of repeater amplifiers in a transmission line connecting a transmitting terminal and a receiving terminal, comprising, in combination, oscillators respectively connected to the input of each repeater amplifier with each oscillator generating a signal different from that of any other oscillator associated with a group of amplifiers under test, means at said receiving terminal to select and rectify the signals received from subgroups of three consecutive amplifiers in said transmission line, means to halve and invert the polarity of the rectified signals from the least and the most remote from said receiving terminal of said three amplifiers, and means to add said halved and inverted signals to the rectified signal received from the third amplifier in said subgroup.

2. Apparatus for monitoring the operation of auxiliary repeaters and regulating repeaters in a transmission line connecting a transmitting terminal and a receiving terminal with said repeaters arranged in groups each group having two regulating repeaters with a first of said regulating repeaters located in the middle of each said group and the second of said regulating repeaters located at the transmitting terminal end of each said group said apparatus comprising, in combination, oscillators respectively connected to the input of each repeater with each oscillator generating a signal different from that of any other oscillator associated with said group of repeaters, means to actuate the oscillators of each repeater of said group of repeaters, an oscillator at the receiving terminal to generate a reference signal, means to compare the signal from the regulating repeater closest to the transmitting terminal in each group with said reference signal generated at said receiving terminal to determine whether a faulty repeater is present in that group or any group closer to the receiving terminal, means to compare the signal from the regulating repeater in the center of a group found to contain a faulty repeater with said reference signal to determine whether the faulty repeater lies in that half of the group between the regulating repeater closest to the transmitting terminal and the regulating repeater in the center of the group or that half of the group between the regulating repeater in the center and the receiving terminal, means to select and rectify the signals received from subgroups of three consecutive repeaters in that section of a group found to contain a faulty repeater, means to halve and invert the polarity of the rectified signals from the least and most remote of said repeaters from said receiving terminal of said three repeaters in said subgroup, and means to add said halved and inverted signals to the rectified signal from the third repeater.

3. Apparatus for determining the location of a faulty regulating or auxiliary repeater in a transmission line connecting a transmitting terminal and a receiving terminal, said repeaters being arranged in sections with a first regulating repeater located in the middle of such a section and a second regulating repeater located at the transmitting terminal end of the test section, said apparatus comprising, in combination, oscillators respectively connected to the input of each regulating repeater, means to actuate said second regulating repeater in each said test section, an oscillator at the receiving terminal to generate a reference signal, and means to compare the signal from each of said second regulating repeaters with the reference signal received from said oscillator at said receiving terminal.

4. Apparatus in accordance with claim 2 wherein said means to compare the signals from said regulating repeaters with said reference signal received from said receiving terminal comprises in combination, a converter circuit, a beat frequency oscillator connected to said converter circuit, means to apply said received signals to said converter circuit so that said oscillator signals from the oscillators associated with said regulating repeaters and said receiving terminal are reduced in frequency, filter-rectifier circuits to derive signals representing said regulator oscillator signals and said reference signal from the output of said converter circuit and rectify said signals, and differential measuring means connected to the output of said filter-rectifier circuits to measure the difference between the levels of the signal output of said filter-rectifier circuits.

5. Apparatus in accordance with claim 2 wherein said means to select the signals from subgroups of three consecutive repeaters in that section of a group found to contain a faulty repeater comprises, in combination, a converter circuit, a beat frequency oscillator connected to said converter circuit, means for applying said received signals to said converter circuit so that said oscillator signals from the oscillators associated with said repeaters are reduced in frequency, and filter-rectifier circuits to derive the signals representing said regulator oscillator signals from the output of said converter circuit.

References Cited

UNITED STATES PATENTS

| | | |
|---|---|---|
| 2,823,270 | 2/1958 | Cameron. |
| 3,047,678 | 7/1962 | Ingram. |
| 3,327,289 | 6/1967 | Goldstine. |
| 3,325,605 | 6/1967 | Brewer. |

KATHLEEN H. CLAFFY, *Primary Examiner.*

ARTHUR A. McGILL, *Assistant Examiner.*